United States Patent [19]

Delery

[11] Patent Number: 5,307,613
[45] Date of Patent: May 3, 1994

[54] DEVICE FOR TAKING UP AND FOR STORING GRASS OR SIMILAR PRODUCTS AND VEHICLE FITTED WITH SUCH A DEVICE

[75] Inventor: Marc Delery, Trevoux, France

[73] Assignee: Creations Delery, France

[21] Appl. No.: 4,600

[22] Filed: Jan. 14, 1993

[51] Int. Cl.$^5$ ............................................. A01D 34/70
[52] U.S. Cl. ..................................... 56/202; 56/13.3; 56/16.6
[58] Field of Search ................. 56/13.3, 16.6, 320.2, 56/202

[56] References Cited

U.S. PATENT DOCUMENTS

| | | | |
|---|---|---|---|
| 4,104,852 | 8/1978 | Tackett | 56/202 |
| 4,142,351 | 3/1977 | Neice et al. | 56/202 |
| 4,345,416 | 8/1982 | Cameron | 56/202 X |
| 4,426,830 | 1/1984 | Tackett | 56/202 |
| 4,936,885 | 6/1990 | Samejima et al. | 56/13.3 |

FOREIGN PATENT DOCUMENTS

| | | |
|---|---|---|
| 0131245 | 4/1984 | European Pat. Off. . |
| 2423968 | 4/1978 | France . |
| 2530920 | 7/1983 | France . |
| 2571587 | 10/1984 | France . |

*Primary Examiner*—David J. Bagnell
*Attorney, Agent, or Firm*—Harris Beach & Wilcox

[57] ABSTRACT

Device for cutting, picking up, and for temporarily storing grass or similar products with a view to transporting the stored product to a site for further processing. The device is integrally mounted to a vehicle so that it may be moved over an area of grass to be cut. The device includes a cutting head to cut and to take-up the lawn clippings. The cutting head is connected to first and second transfer pipes utilized to direct the cut grass to the interior of a storage enclosure. A turbine is horizontally mounted under the storage enclosure between the first and second transfer pipes and is dissociated from the cutting head. The turbine provides suction inside the first pipe so that cut grass may be moved from the cutting head toward the turbine. A turbine wheel with blades moves the cut grass tangentially into the second pipe which is integrated with the storage enclosure so as to direct the flow of cut grass into the enclosure. The turbine is driven by a transmission belt that is connected to a driving pulley that operates the cutting head. The storage enclosure is composed of first and second molded members. The first molded member is pivotally movable relative to the second molded member which is rigidly fixed and supported at the rear of the vehicle.

6 Claims, 4 Drawing Sheets

DEVICE FOR TAKING UP AND FOR STORING GRASS OR SIMILAR PRODUCTS AND VEHICLE FITTED WITH SUCH A DEVICE

BACKGROUND OF THE INVENTION

1. Field of the Invention

The present invention relates to an improvement made to devices for taking up loose products from the ground, with a view to ensuring their transfer from the take-up site to a discharge zone. It relates equally to vehicles fitted with such a device, and more particularly to a new type of lawn mower.

2. Discussion of the Prior Art

In many spheres, the problem is encountered of having to take up a material from a site with a view to transporting it into another zone. Such a problem arises in particular during the maintenance of green spaces (sports fields, golf courses, lawns, parks . . . ) in order to pick up grass after mowing, remove leaves or other waste.

In the continuation of the description, the invention will be described for such an application (picking up grass after or during mowing), but it is plain that this is not limitative and that the invention could be applied in other spheres where similar problems arise, such as for example on machines used for cleaning the ground, particularly roads and pavements.

At the present time, the equipment serving to carry out mowing operations is constituted by a "tractor" type vehicle on which is mounted an assembly which serves not only for cutting the grass, but also for picking it up and storing it with a view to its disposal. Such an assembly, one embodiment of which in current use at the present time is shown in the accompanying FIG. 1, is constituted essentially by a head, designated by the general reference (1), movable close to the surface of the ground, mounted in general under the chassis of the vehicle (2) (or in front of the latter), these heads comprising means serving to cut and to take up the grass which is transferred by means of a connecting pipe (3) to a storage enclosure (4) carried by the vehicle, which enclosure can appear in different forms and can consist for example of a simple bag, a fixed or tipping hopper or, as is shown in the accompanying FIG. 1, of an assembly constituted essentially by two shells (5, 6) which define between them the volume for storage of the material. In such an embodiment, the two shells (5, 6) are mounted at the rear of the vehicle through the intermediary of a beam (7), one shell (5) being mounted fixed to the said beam (7) and the other shell (6) being capable of pivoting on a horizontal axis (8). Means constituted for example by a jack (9) and a system of "gas caliper" type (10), serve to control the movements of the shell (6) with respect to the fixed shell (5), so that they can be maintained in separated position as is shown in said FIG. 1 when it is desired to proceed to an operation of unloading the hopper after filling and so that they are maintained pressed against one another in order to define the storage volume during the mowing operation per se.

In such assemblies, in order to carry out the transfer of the grass cut by the cutting members per se (11), a turbine (12) is used which serves to transfer the grass through the connecting pipe (3) which opens into the upper part of the storage enclosure (4) and, in the present case, to the interior of the fixed shell (5). The most widespread solution, shown in the accompanying FIG. 1, consists of disposing the turbine (12) either vertically as shown in FIG. 1, or horizontally; the grass may or may not be subject to the action of the blades of said turbine.

One of the main problems which arise with such assemblies in which the turbine is associated directly with the cutting head, resides in their lack of effectiveness, particularly when the grass is wet, taking into account the long distance between said turbine and the zone of discharge to the interior of the storage enclosure. Moreover and especially, such a design (cutting member and integrated turbine) leads to a large overall width dimension, since the turbine projects laterally with respect to the cutting head per se, and also to the complex construction of power transmission assemblies, especially when the turbine is disposed vertically, necessitating in general the use of pinions, bevel gears, universal joints. . . . Lastly, such integrated assemblies (cutting head and turbine) are difficult to assemble and disassemble, which complicates their maintenance.

OBJECTS AND SUMMARY OF THE INVENTION

However, a device of simple design has been found, which makes it possible to solve all of these problems, and this is what forms the subject of the present invention.

In a general way, the invention relates therefore to an improvement made to devices for carrying out the taking up (cutting and picking up) as also the storage of grass (or similar products) with a view to their disposal, and which appears in the form of an assembly constituted by a head movable close to the surface of the ground and which serves to cut and to take up the grass in order to transfer it by means of a connecting pipe to the interior of a storage enclosure associated with the vehicle serving to move said assembly, the improvement according to the invention being characterized in that the turbine is dissociated from the cutting and take-up head per se in order to be mounted, horizontally, underneath the storage enclosure, said turbine creating a suction inside a pipe connecting it to the take-up head per se, which pipe opens axially into the turbine, the material taken up being transferred tangentially by the turbine to the interior of a pipe integrated with the storage hopper, and which permits the discharge of the grass to the interior of said hopper.

According to a preferred embodiment according to the invention, the driving in rotation of the turbine is performed by a transmission belt driven directly by the driving pulley operating the cutting head per se.

Furthermore, the storage enclosure disposed at the rear of the vehicle is preferably constituted by two molded members the structure and the mounting of which on the vehicle are such that:

the first member forms a box or container which defines the volume for storage of the material and has an open bottom (or base), this member being capable of pivoting on a horizontal axis situated in its upper part;

the second member (flap) being fixed and supported at the rear of the vehicle, has a surface complementary to the open bottom of the first member serving to close it during the filling operation, this member appearing in the form of a box underneath which is disposed the transfer turbine and to the interior of which opens the pipe for connection to the cutting and take-up head, the outlet pipe from said turbine coming to face an internal pipe provided inside the movable container, which serves to project the grass into the upper part of the enclosure during the mowing operation.

BRIEF DESCRIPTION OF THE DRAWINGS

The invention and the advantages derived from it will however be better understood with the help of the embodiment given below as an indicative, but non-limitative, example and which is shown in the accompanying diagrams in which.

DETAILED DESCRIPTION OF THE PREFERRED EMBODIMENT

Figure 1:
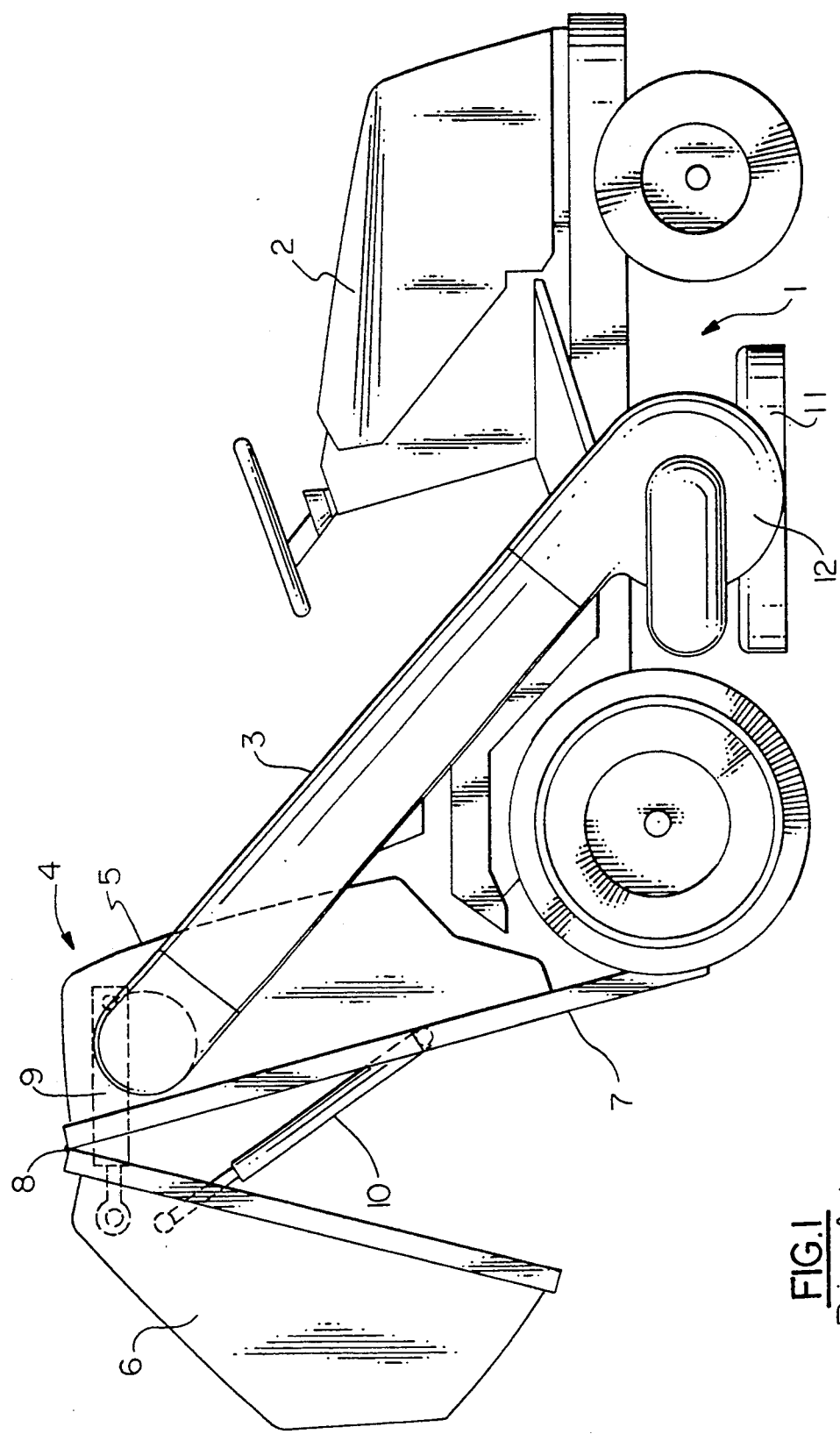
FIG. 1 shows, as previously stated, the prior art.

With reference to the accompanying diagrams, and using the same references as those used to describe the state of the art shown in FIG. 1, the invention relates to an improvement made to assemblies for taking up loose products from the ground in order to ensure their transfer from the take-up site to a discharge zone.

Figure 2:
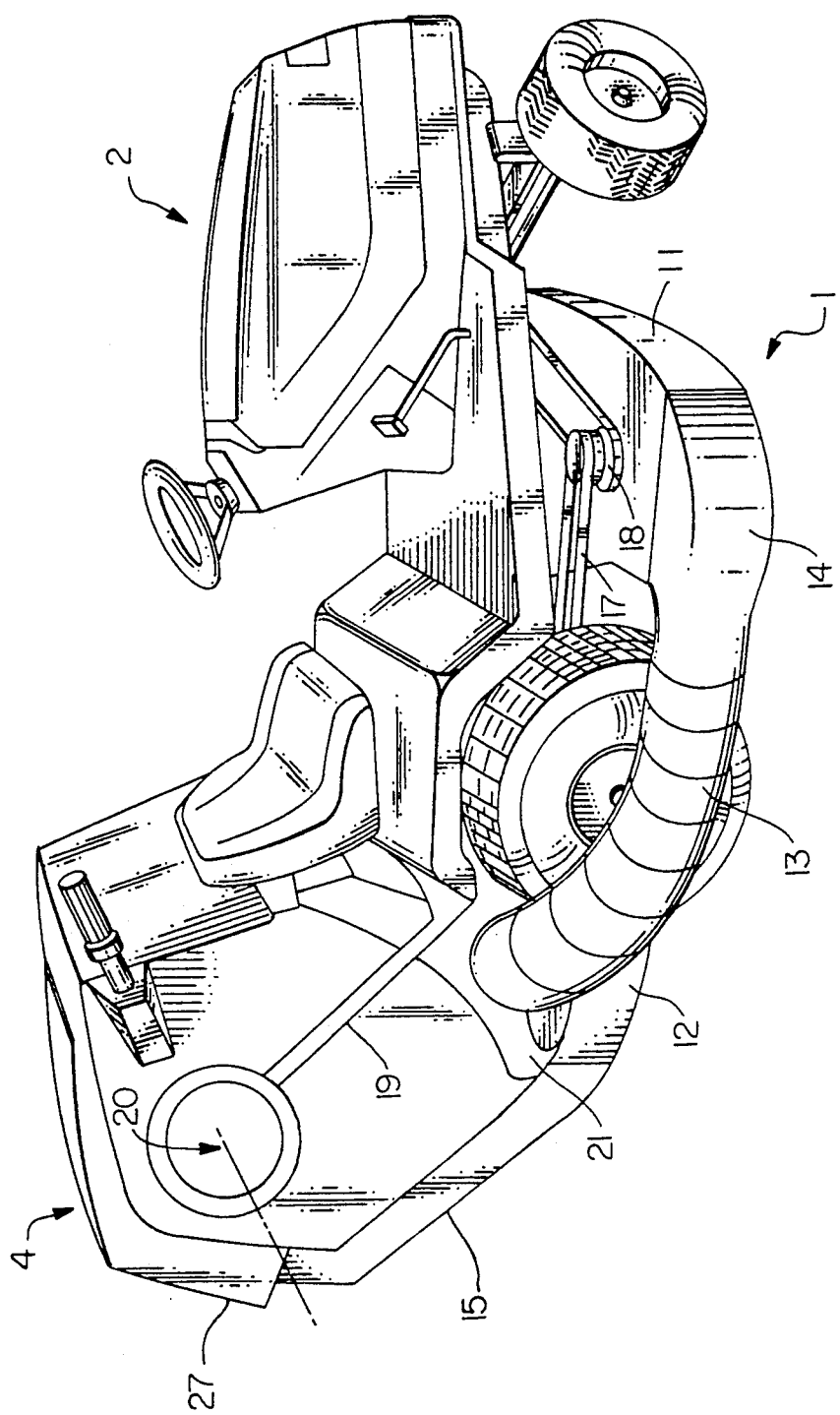
FIG. 2 is a diagrammatic perspective view showing the structure of a lawn mower fitted with a recovery device according to the invention, the storage enclosure being shown in the closed position.

In the example of an application shown, in FIG. 2 in the case of vehicles of tractor type (2), the assembly according to the invention, designated by the general reference (1) is mounted on said vehicle (2), and is constituted essentially by a cutting assembly per se (11) and a turbine (12) serving to ensure the transfer of the cut grass to the interior of a recovery enclosure (4) disposed at the rear of the vehicle.

Figure 3:
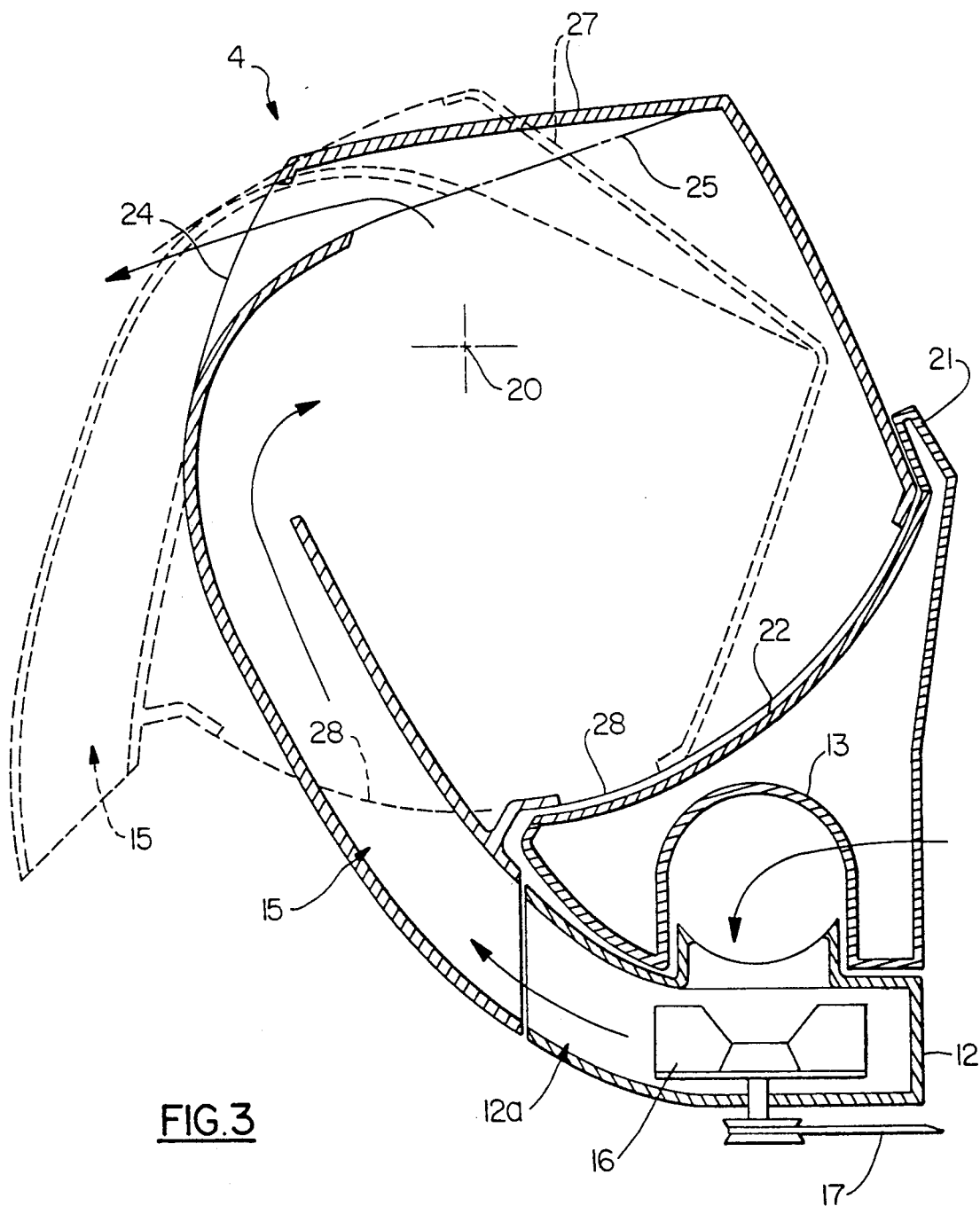
FIG. 3 is a detail view, in cross-section, showing the manner in which the transfer of the grass to the interior of the storage enclosure is carried out, and also the structure of the latter, in solid lines during a mowing operation, in broken lines during an unloading operation.
Figure 5:
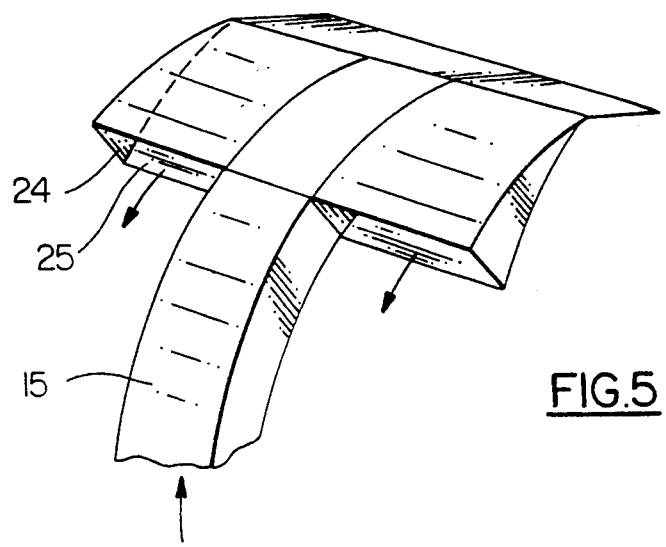
FIGS. 4 and 5 are detail views, FIG. 4 showing the manner in which may be constructed the power transmission of the various members (mowing head and turbine) of an assembly according to the invention, and FIG. 5 the manner in which is constructed the air exhaust in one embodiment of a storage container of an assembly according to the invention.
Figure 4:
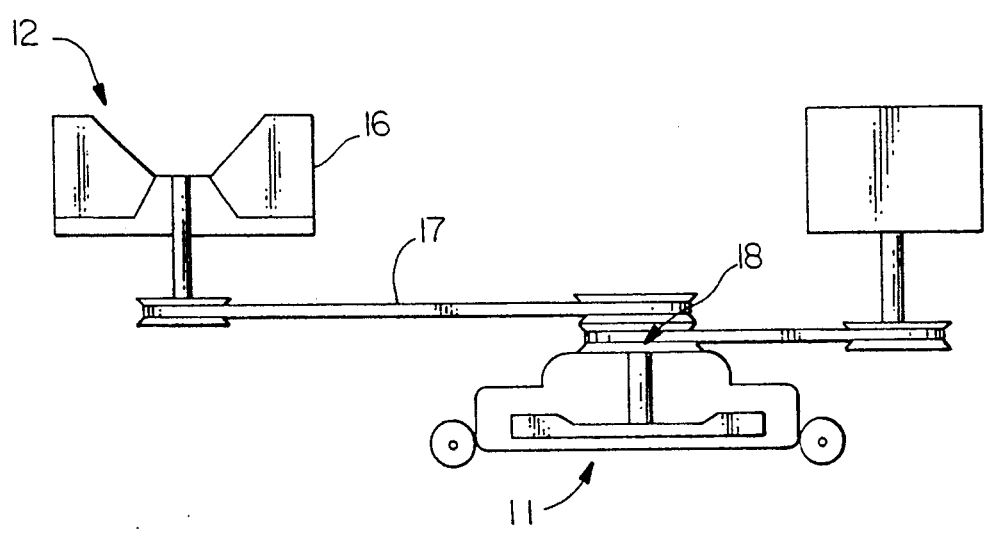

According to the invention as shown in FIG. 2, the transfer turbine (12) is dissociated from the cutting and take-up head (11) and is mounted, horizontally, underneath the storage enclosure (4). The turbine (12) is connected through the intermediary of a pipe (13) to the outlet or spout (14) of the take-up head (11), said outlet being constituted by a spout disposed laterally with respect to the casing of said take-up head (11). The turbine (12) creates the suction inside the pipe (13) interacting thus, with the mechanical action produced by the cutting member (11) in order to ensure the transfer of the grass. The pipe (13) opens axially with respect to the turbine (see FIG. 3). The outlet from the turbine is, as is also apparent from FIG. 3, constituted by an outlet pipe (12a) which, when the storage hopper (4) is in the closed position, is positioned facing a transfer pipe (15) forming an integral part of the shell of said hopper, and which permits the discharge of the grass to the interior of the latter.

According to the preferred embodiment shown, the driving of a wheel with blades (16) of the turbine (12) is performed by a transmission belt (17) driven directly by the driving pulley (18) operating the cutting head per se. Such an installation makes it possible to have a simplified and very reliable transmission assembly which is easy to maintain.

The storage enclosure (4) disposed at the rear of the vehicle is preferably constituted by a molded assembly. The said assembly consists essentially of a first box-shaped member (27) which defines the volume for storage of the material. This box (27) has an open bottom or base (28), and is mounted in the manner shown in FIG. 2 through the intermediary of a beam (19) permitting its pivoting about a horizontal axis (20) situated in its upper part. A second member (21), also molded, is mounted fixed to the rear of the vehicle and comprises a solid surface (22) having a shape and dimensions complementary to the open bottom (28) serving to close it during the filling operation (position shown in solid lines in FIG. 3). This member (21) appears in the form of a box underneath which is disposed the transfer turbine (12). The connecting pipe (13) opens into the interior of this box, opening into it in such a way that the induction of the grass is performed in the axial position with respect to the blades (16) of said turbine. By virtue of such a design, the cut grass is projected mechanically to the interior of the spout (14) and of the pipe (13) by the cutting members per se, its transfer being facilitated by the suction produced by the turbine. The transfer from the turbine (12) to the interior of the storage enclosure (4) is brought about by the mechanical action of the blades (16) which project the cut grass to the interior of the outlet pipe (12a) provided on the turbine body in the transfer pipe (15) which forms an integral part of the container (4). The grass is discharged to the interior of the container (4) through its upper part. The air escapes from the enclosure (4) through outlets (24) provided at the upper part of the movable container (27), an internal grille (25) being provided moreover in order to prevent the escape of grass to the outside.

Such as assembly of particularly simple design has very many advantages in comparison with the prior solutions, among which can be cited;

a very high efficiency in the operation of transfer of the grass from the cutting and take-up head to the storage enclosure;

high reliability and easy maintenance;

a better distribution of the struts on the vehicle and a reduction in the overall dimensions.

Of course, the invention is not limited to the embodiment example described above, but it covers all variants thereof constructed in the same spirit.

What is claimed is:

1. A device for taking up and temporarily storing loose material from the ground for use with a tractor type vehicle, the device including:

a head member for taking up loose material from the ground, said head member being positioned on the vehicle so that the clearance between the head and the ground allows the head to pass over the ground material;

enclosure means for temporarily storing and transporting the material collected from the ground;

first pipe means for transferring the material from said head member to said enclosure means;

second pipe means formed within said enclosure means for directing and projecting the flow of material into the upper part thereof during the take-up operation; and turbine means for creating suction in said head member and said first pipe means, said turbine means being mounted horizontally underneath said enclosure means between said first and second pipe means so that said first pipe means opens axially above said turbine means.

2. The device according to claim 1 wherein said head member further includes a cutting member for mowing grass as said head member is moved over the ground by the vehicle.

3. The device according to claim 2 wherein said turbine means includes a turbine housing having:

an inlet port being permanently connected to said first pipe means;

an outlet port being removably connected to said second pipe means; and a turbine wheel having at least two blades whereby when said turbine means is activated, the ground material is moved by suction from said head member through said first pipe means toward said turbine means and then impelled tangentially by the blades through said second pipe means into said enclosure means.

4. The device according to claim 3 further including a transmission belt and a driving pulley connected directly to said cutting member, said transmission belt being mounted between said driving pulley and said turbine wheel of said turbine means so that the wheel is rotated to create suction within said head member and said first pipe means.

5. The device according to claim 4 wherein said enclosure means includes a storage container having a first molded box member and a second molded flap member.

6. The device according to claim 5 wherein said first molded box member defines the volume for material storage, has an open bottom, includes said second pipe means being removably connected to the outlet port of the turbine housing; and is capable of pivoting about a horizontal axis passing through its upper half so that the contents of said first molded box member may be dumped when said box member is rotated about said axis; and said second molded flap member is rigidly supported at the rear of the vehicle, and has a surface complementary to the open bottom of said first molded box member to close the box member during the filling operation.

* * * * *